United States Patent [19]

Gentili

[11] 3,987,887
[45] Oct. 26, 1976

[54] APPARATUS FOR TRANSFERRING AND POSITIONING PAPER REAMS ONTO A CONVEYOR SYSTEM

[76] Inventor: Vittorio Gentili, Via Caprarie 3, Bologna, Italy

[22] Filed: Dec. 10, 1975

[21] Appl. No.: 639,555

[30] Foreign Application Priority Data

Dec. 13, 1974 Italy .................................... 3565/74

[52] U.S. Cl. ............................... 198/486; 198/474; 214/1 BB; 214/1.7; 74/828
[51] Int. Cl.² ......................................... B65G 47/00
[58] Field of Search ............. 198/20 R, 24, 29, 218; 214/1 BB, 1 BC, 1 BS, 1 BT, 1.7; 74/25, 27, 38, 40, 42, 45, 828, 833, 834, 837; 271/85, 268

[56] References Cited
UNITED STATES PATENTS

| | | | |
|---|---|---|---|
| 966,524 | 8/1910 | Chace et al. | 74/45 |
| 1,867,389 | 7/1932 | Sylvester | 198/20 R |
| 2,787,465 | 4/1957 | DeLaMotte | 198/218 |
| 2,818,963 | 1/1958 | DeBuigne | 198/218 |
| 3,302,539 | 2/1967 | Moffet | 198/20 R |
| 3,853,213 | 12/1974 | Lehman et al. | 198/24 |

*Primary Examiner*—Evon C. Blunk
*Assistant Examiner*—Joseph E. Valenza
*Attorney, Agent, or Firm*—Guido Modiano; Albert Josif

[57] ABSTRACT

Apparatus for transferring and positioning paper reams onto the feed conveyor of paper ream wrapping machines, comprising a lever member hinged at one end and connected with its opposite end to a gripper assembly, a connecting rod member having its ends respectively mounted pivotally to the lever member and to one arm of a crank lever member actuated to impart to the lever member an oscillating movement. A control means is provided for shifting the pivot between the lever member and the crank lever member and the rotation axis of the crank lever member parallel to itself, such as to vary the amplitude of the oscillation angle of the lever member according to the size of the paper reams to be transferred to the conveyor and selectively cause the angle to lead and lag so that the stroke limits of the lever member happen to coincide with the fixed positions respectively of ream pick up and ream release along a predetermined conveyor axis.

3 Claims, 4 Drawing Figures

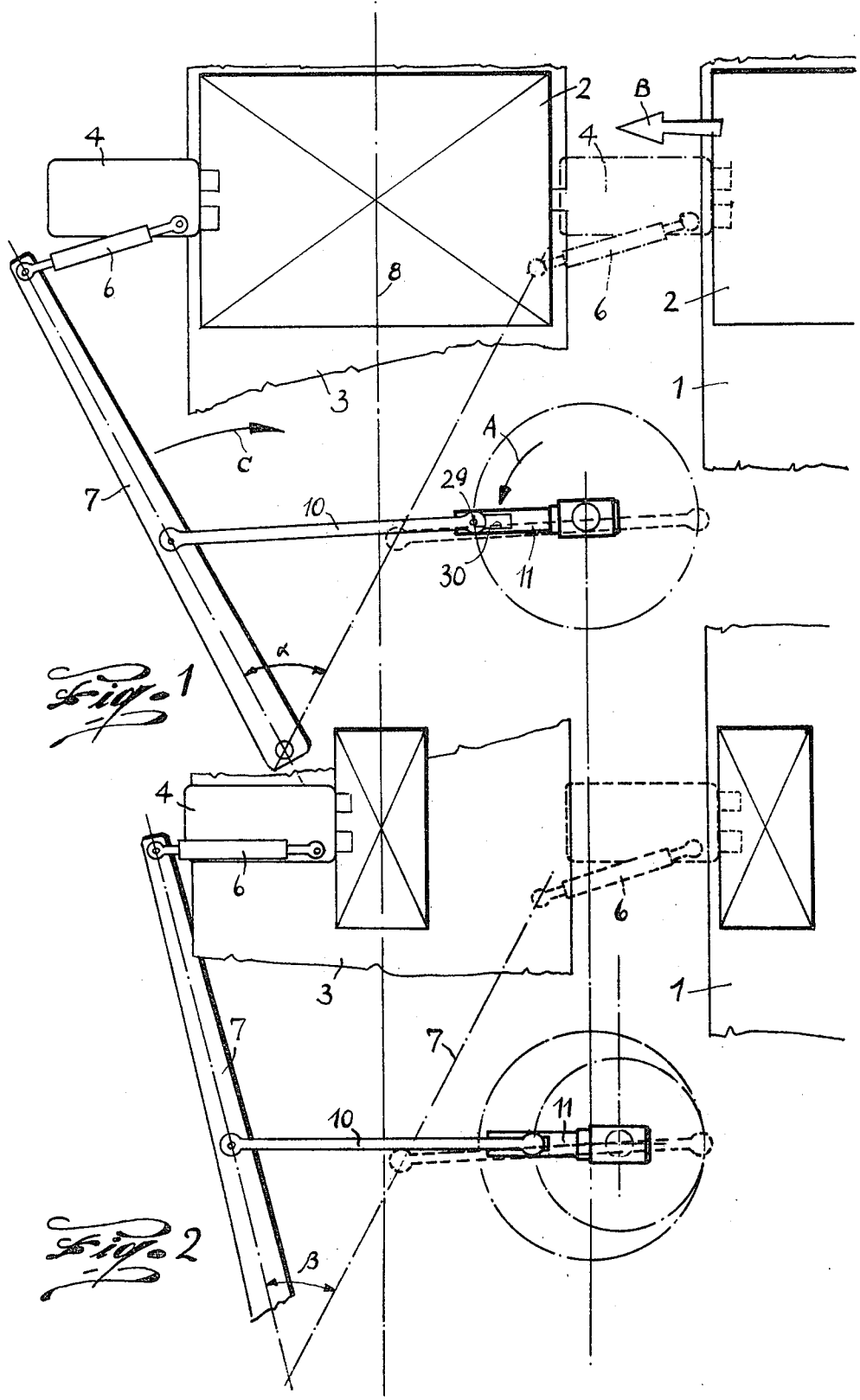

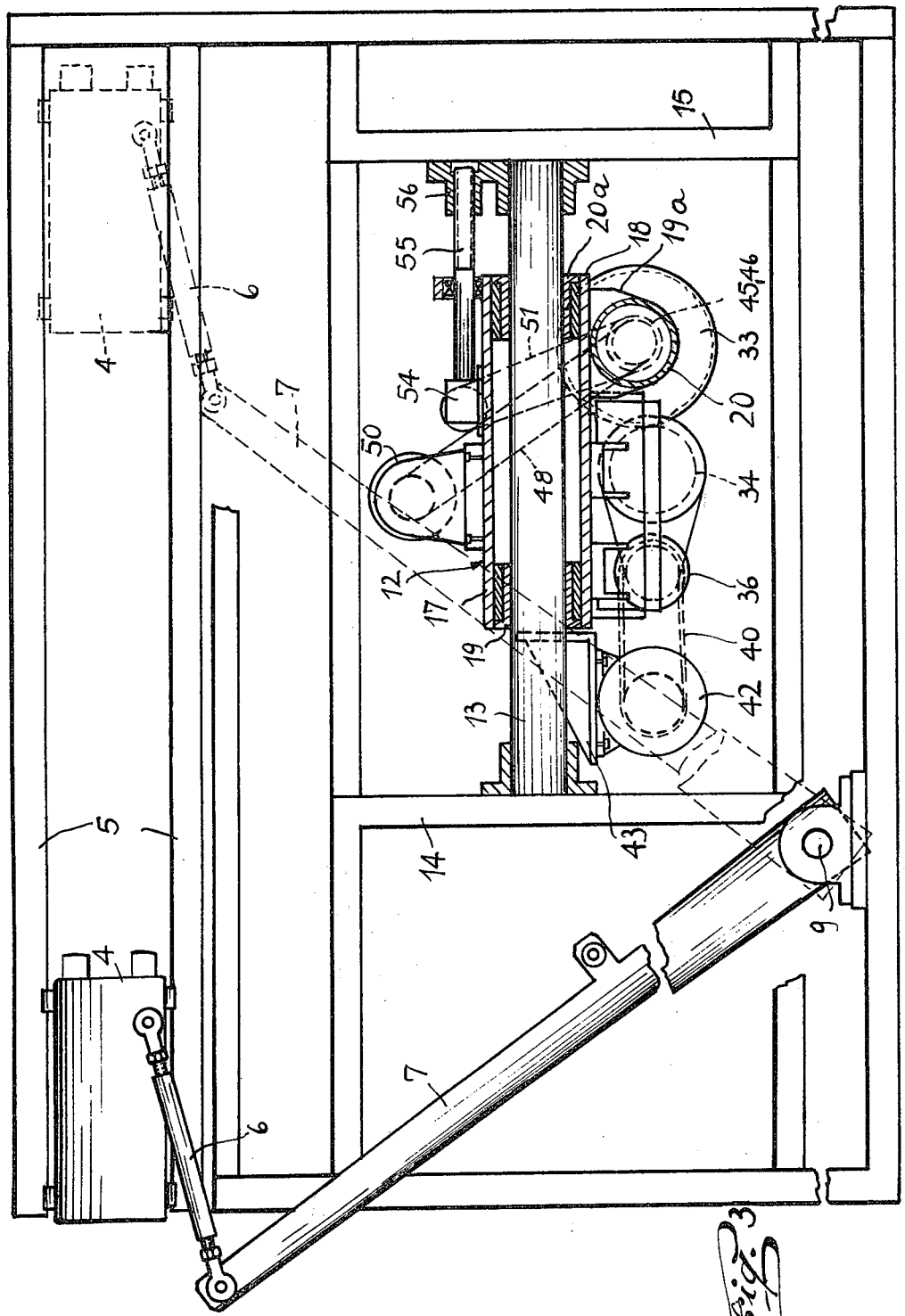

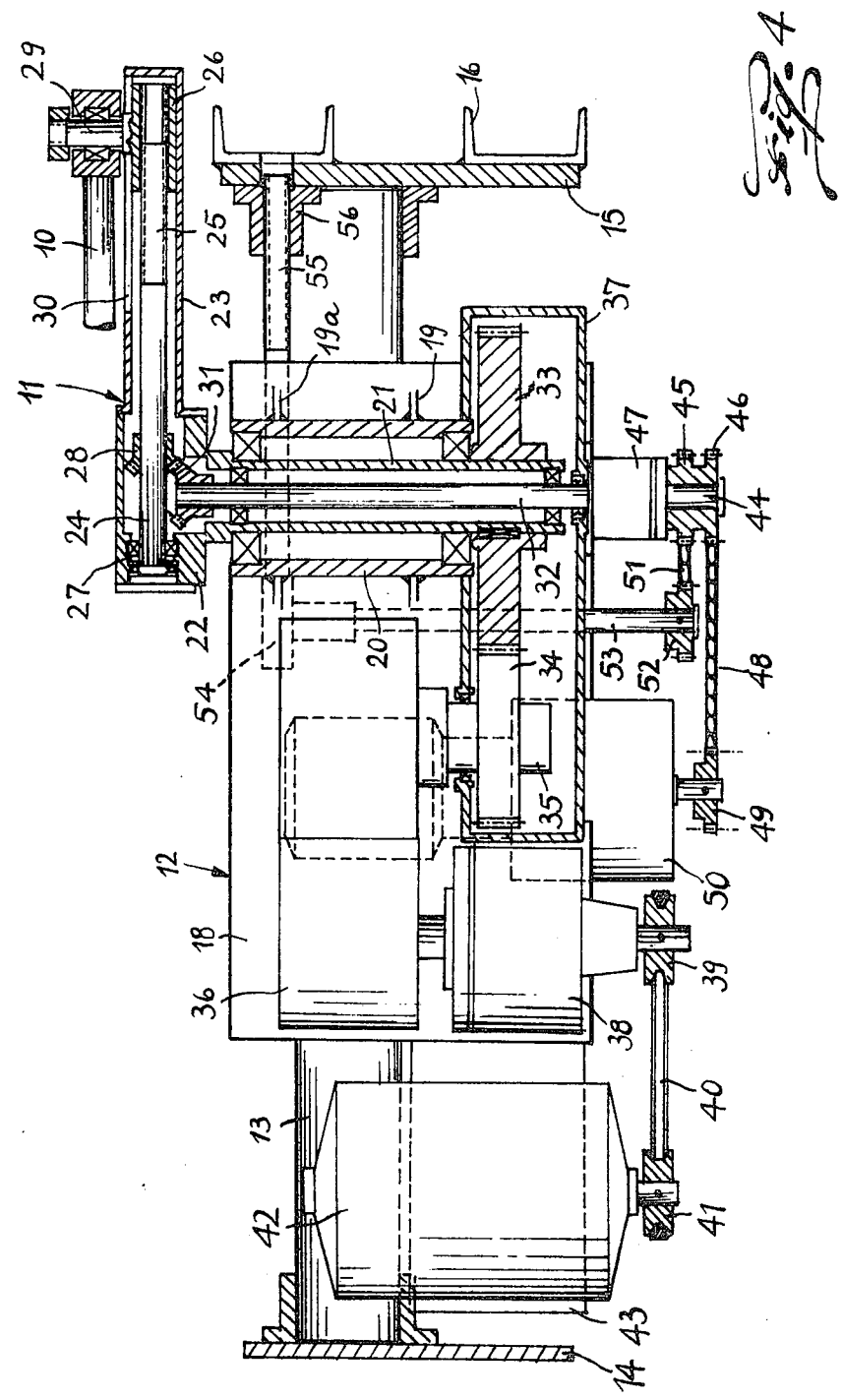

APPARATUS FOR TRANSFERRING AND POSITIONING PAPER REAMS ONTO A CONVEYOR SYSTEM

BACKGROUND OF THE INVENTION

This invention relates to an apparatus for transferring and positioning reams of paper onto a conveyor system, and particularly to a feeding conveyor for wrapping machines.

The feeding of paper ream wrapping machines using sheets of wrapping or packing paper poses the problem of centering such reams onto the conveyor such that the longitudinal centerline of the latter coincides with the ream centerlines regardless of the ream size.

SUMMARY OF THE INVENTION

Therefore, it is a primary object of this invention to provide an apparatus which is effective to transfer paper reams onto a conveyor and simultaneously position them as required.

It is another object of the invention to provide such an apparatus which is structurally simple and highly reliable in operation, very flexible application-wise, i.e. capable of operating with reams having widely variable dimensions.

These and other objects, such as will become apparent hereinafter are achieved by an apparatus which is characterized in that it comprises a lever member hinged at one end and connected with its opposite end to a gripper assembly, a connecting rod member having its ends respectively mounted pivotally to said lever member and to one arm of a crank lever member actuated to impart to said lever member an oscillating movement between a stationary position whereat said gripper assembly picks up a ream from a supporting surface, and a position whereat said gripper assembly releases the ream onto a conveyor, a control means being provided for shifting the pivot between said lever member and said crank lever member and the rotation axis of the crank lever member parallel to itself, such as to vary the amplitude of the oscillating angle of the lever member according to the size of the paper reams to be transferred to the conveyor and selectively cause said angle to lead and lag so that the stroke limits of the lever member happen to coincide with the fixed positions respectively of ream pick up and ream release along a predetermined conveyor axis.

BRIEF DESCRIPTION OF THE DRAWINGS

Further features and advantages of the present invention will become more apparent from the following detailed description of a preferred, though not exclusive, embodiment thereof, as illustrated by way of example and not of limitation in the accompanying drawing, where:

FIGS. 1 and 2 show schematically in plan view the operation principle of the inventive apparatus;

FIG. 3 is a plan view of the apparatus with some parts cut away for clarity, and FIG. 4 is a partly sectional elevation view of the apparatus in FIG. 3.

DESCRIPTION OF THE PREFERRED EMBODIMENT

With reference to FIG. 1, the numeral 1 identifies the ream supporting surface wherefrom the paper reams must be individually transferred onto a wrapping machine feeding conveyor including a conveyor belt 3. The ream transfer step is effected by means of a system comprising a gripper assembly 4 (of known configuration and, accordingly, not shown), which is slidable mounted to a pair of rail members 5 (FIG. 3) and driven, through a link 6, by a lever 7, oscillating in a horizontal plane, which is effective to move it between a fixed or stationary initial position (shown in dotted lines in FIG. 1) and a stroke limit position (shown in full lines in FIG. 1) whereat the longitudinal centerline 8 of the belt 3 coincides with the centerline of the ream 2 transferred thereto.

The oscillating movement of the lever 7 about its pivotal point 9 is controlled by a crank lever and connecting rod mechanism the connecting rod whereof, as shown in 10, is hinged with one end to a fixed point in the lever 7 and with the other end to a point of the crank lever 11 located at an adjustable distance from the rotation axis of the crank lever. The crank lever is supported such that its rotation axis may be shifted with respect to the centerline 8. Such adjustment method for the crank lever 11 radius allows, accordingly, for the amplitude of the lever 7 oscillation angle α to be varied, while the adjustment of the crank lever 11 rotation axis position causes said oscillation angle to lead and lag such that the gripper assembly 4 happens to be at a ream 2 pick up position from the surface 1, at one limit of end of stroke, and at the other limit or end of stroke at a position suitably located for releasing said ream in alignment relationship to the longitudinal centerline of the conveyor 3. To further evidence the operating mode of the apparatus according to the instant invention, FIG. 2 shows how in order to transfer reams having a width dimension smaller than in FIG. 1, the crank lever 11 arm has been reduced, while rotation axis has been shifted to the right, thereby the gripper assembly 4, when the lever 7 is at either of its stroke limits, is at its fixed or stationary position of ream pick up and of ream release onto the belt 3 centerline.

The means provided for adjusting the length and position of the crank lever includes a carriage 12 (FIGS. 3 and 4) which is slidably and horizontally supported by a cylindrical bar 13 extending perpendicularly with respect to the axis 8 and having opposite ends attached to shoulders 14, 15 of a frame 16 whereto the lever 7 is also journalled.

The carriage 12 is prevented from rotating about the bar 13 by lengthwise arranged keys which, however, allow the carriage to slide in an axial direction. It comprises a pair of plates 17, 18 wherebetween bushings 19, 20a are provided to guide its sliding motion along the bar 13. To the plate 18, through stiffening ribs 19a, a vertical sleeve 20 is affixed wherewithin a tubular element 21 is pivotally supported by means of suitable bearings. A flange 22 is provided at the top of the tubular element 21 for the purpose of attaching a hollow arm 23 which extends radially and, as made clear hereinafter, together with the sleeve makes up the crank lever 11 as mentioned above.

A shaft 24 is received inside the hollow arm 13 which is formed with a threaded portion 25 engaging a nut 26, which is guided in that same arm.

The opposite end of the shaft 24 is supported by a thrust bearing 27, and a bevel gear 28 is keyed thereto.

A pivot pin 29 is integral with the nut 26 and extends upward and outward through a slot 30 formed longitudinally in the hollow arm 23 which acts as a pivot member for the connecting rod 10.

The bevel gear 28 meshes with a bevel gear 31 keyed onto the shaft 32 which is supported in the sleeve 21 for rotation therewithin and projects downwardly beyond the latter end. The tubular element 21 projects downwardly beyond the sleeve 20, and a gear wheel 33 is keyed onto said projecting portion. The gear wheel 33 meshes with a gear keyed to the output shaft 35 of the reduction unit, shown schematically in the drawing and denoted generally with the numeral 36. The gears 33, 34 are mounted inside a box 37 affixed to the carriage 12.

A coupling 38, e.g. of the electro-magnetic type, is provided on the reduction unit 36 input shaft, the housing wherefor is mounted to the plate 18. The coupling 38 input shaft carries an integral pulley 39 whereround a belt 40 is wound and around a drive pulley 41 keyed onto the shaft of a motor 42. That motor 42 is flange mounted to a bracket 43 affixed to the carriage 12 and located under the bar 13. The shaft 32 is formed with a portion 44 which projects below the box 37 and whereto a twin gear wheel 45, 46 is mounted pivotally which may, however, be coupled to the portion 44 by means of an electromagnetic type of coupling 47.

The gear wheel 46 is engaged by a chain 48 also in mesh with a pinion 49 splined onto the output shaft of a speed reducer 50 secured to the plate 17. The gear wheel 45 is also engaged by a chain 51 in mesh engagement with a pinion 52 keyed to a vertical shaft 53 being supported pivotally on the plate 17.

The top of the shaft 53, through an angular drive 54 (e.g. a bevel gear system), is connected to the threaded rod 55, extending parallel to the bar 13 and threaded into a threaded bushing 56 integral to the shoulder 15.

The operation of the apparatus just described is as follows: When the motor 42 is energized, a counter-clockwise rotation in the direction of the arrow A in FIG. 1 is imparted to the tubular element 21 and accordingly to the crank lever 11 through the drive 39–41, coupling 38, reduction gear 36, and gears 33, 34. During a 180° rotation from the right to the left, the lever 7 effects an angular movement which brings the gripper assembly, in the direction of the arrow B, from the position shown in dotted lines to the position shown in full lines, corresponding respectively to the ream pick up position and ream release position.

During the rotation from left to right, the lever 7, after releasing the ream 2 onto the belt 3, is returned in the C direction to the position ready to pick up a fresh ream. The above operation cycle repeats itself for every revolution of the crank lever 11, during which the lever 7 effects a forward and reverse oscillation.

It will appear that if the same oscillation angle is maintained for the lever 7 when the size of the reams to be transferred changes, the latter would be released onto the conveyor belt in offset positions with respect to the centerline 8. For instance, a ream having a shorter width dimension than the one illustrated in FIG. 1, would be released toward the left side of the belt 3, i.e. off-center with respect to the centerline 8. In order to obviate this drawback, the angle $\alpha$ is adjusted and said angle $\alpha$ is advanced by adjusting the position of the rotation center of the crank lever such that the right-hand stroke limit, corresponding to the pick up position, is at all times located at one point. The angle amplitude is adjusted by actuating the electro-magnetic coupling 47 such as to cause the gear wheel 46 to become rotationally integral with the shaft 32, thereby as the speed reducer 50 is operated the threaded rod 25 screws itself into the nut 26, thus causing the nut to move and consequently also the pivot pin 29 of the connecting rod 10, the latter moving closer to the rotation axis of the tubular element 21. This is equivalent to making the crank lever 11 arm shorter, and thus reducing the oscillation angle of the lever 7, as denoted with $\beta$ in FIG. 2. At the same time, through the drive 45, 51–55, the threaded rod 55 is caused to screw itself into the bushing 56 which, in turn, causes the carriage to move to the right. The amount of that movement is such that the gripper assembly, which consequently to the lever 7 oscillation angle variation would remain away from the ream to be picked up at the right-hand stroke limit, is brought back to the correct position for the ream pick up step.

It should be noted that in general the ratio of the crank lever 11 arm adjustment to the shift of the rotation axis of the same is nearly constant, thereby it becomes possible to simultaneously adjust both parameters independently from one another in the event that said ratio should not remain constant. To this aim, one can, for example, adjust the crank lever radius first, then disengage the coupling 47, and lastly adjust the crank lever rotation axis position.

In a modified embodiment of the invention, provision is made for the use of a further electro-magnetic coupling effective to controllably connect the shaft 53 to the gear wheel 52.

It should be noted, finally, that during the rotation of the crank lever 11, the coupling 47 is disengaged to allow free rotation for the shaft 32 with respect to the twin gear wheels 44, 45 and thus prevent any relative movement between the bevel gears 38, 31, which would cause the rod 27 to screw in and shift accordingly the pivot pin 29 of the connecting rod 10.

The invention, as described hereinabove, lends itself to further variations, all of which it is intended to cover with the presently described inventive concept. For example, in order to determine the variation of the oscillation angle for the lever 7 and the shift of the rotation axis of the crank lever, one may employ a count control system, such as the one comprising a disc attached to one of the rods 24 or 55 and provided with a plurality of peripherally arranged holes, equally spaced apart, wherewith a photoelectric type of coupling cooperates which, after detecting a given number of pulses proportional to the number of revolutions made by the rods 24, 25, compares them with a predetermined number or a number set in relation to the ream size, thereby bringing the motor 50 to a stop at the desired position.

A remarkable constructional simplification derives from the possibility of eliminating the electro-magnetic coupling 47, by making the gear wheels 45, 46 integral with the shaft 32. In this embodiment, for each rotat.. of the crank lever 11, owing to the kynetic engagement represented by the gear 28, 31, there occurs a shift of the connecting rod 10 pivot point. It is, however, possible to adjust in advance the position of the pivot pin 29 such that at the stroke limit of each crank lever rotation the transferred ream is always positioned on the longitudinal centerline of the conveyor belt 3.

The return of the gripper assembly to the pick up position is effected by operating the crank lever 11 in a direction opposite to A, i.e. by doing the reverse of what has been specified for the embodiment described hereinabove. This permits a neutralization, at each return stroke of the lever 7, of the error incurred during the forward stroke, since the rod 25, by rotating in the opposite direction, brings the pivot pin 29 back to its original position.

The instant invention is susceptible to numerous modifications and variations, all within the spirit and scope of the present inventive concept.

In practicing the invention, the materials used, and the shapes and dimensions employed may be any ones to suit varying application requirements.

I claim:

1. An apparatus for transferring and positioning paper reams onto a conveyor system, particularly onto the feed conveyor of paper ream wrapping machines, characterized in that it comprises a lever member hinged at one end and connected with its opposite end to a gripper assembly, a connecting rod member having its ends respectively mounted pivotally to said lever member and to one arm of a crank lever member actuated to impart to said lever member an oscillating movement between a stationary position whereat said gripper assembly picks up a ream from a supporting surface, and a position whereat said gripper assembly releases the ream onto a conveyor, a control means being provided for shifting the pivot point between said lever member and said crank lever member and the rotation axis of the crank lever member parallel to itself, such as to vary the amplitude of the oscillation angle of the lever member according to the size of the paper reams to be transferred to the conveyor and selectively cause said angle to lead and lag so that the stroke limits of the lever member happen to coincide with the fixed positions respectively of ream pick up and ream release along a predetermined conveyor axis.

2. An apparatus according to claim 1, characterized in that it comprises a slidably guided carriage onto a horizontal bar extending substantially parallel to the direction of sliding of the gripper assembly, a vertical tubular member pivotally supported on said carriage, a gear keyed to said tubular member and driven, through a reduction gear and an electromagnetically controlled coupling, by a motor mounted to said carriage, a hollow arm radially integral to the top of said tubular member and making up with the latter said crank lever member, a pivotally supported rod in the said arm provided with a threaded portion engaging with a nut slidably guided within said hollow arm, and a bevel gear meshing with a bevel gear keyed to a shaft journalled is said tubular member, said nut being provided with a pivot pin projecting from the hollow arm through an elongated slot in the latter and acting as a swivel pin for the connecting rod member, at the bottom end of said shaft there being supported an idle gear connectable to said shaft through an electro-magnetic coupling and driven through a speed reducer mounted to said carriage, there being connected to said gear a further shaft journalled in said carriage and parallel to said tubular member and further connected, through an angular drive, to a rod extending parallel to the carriage supporting bar and being provided with a threaded portion which is engaged in a threaded bushing affixed to the apparatus main frame.

3. An apparatus according to claim 2, characterized in that the amount of shift of the swivel point for said lever member on said crank lever member and of the rotation axis of said crank lever member is dependent upon a device including a disc affixed to one of the threaded rods engaging said nut and said threaded bushing and being provided with a plurality of peripherally arranged holes at equal intervals cooperating with a count photoelectric coupling interlocked with said speed reducer.

* * * * *